United States Patent
Fernihough et al.

(10) Patent No.: US 10,101,481 B2
(45) Date of Patent: Oct. 16, 2018

(54) FLOODABLE OPTICAL APPARATUS, METHODS AND SYSTEMS

(71) Applicant: PGS Geophysical AS, Oslo (NO)

(72) Inventors: Robert Alexis Peregrin Fernihough, Austin, TX (US); Jeremy Crane Smith, Austin, TX (US)

(73) Assignee: PGS Geophysical AS, Oslo (NO)

( * ) Notice: Subject to any disclaimer, the term of this patent is extended or adjusted under 35 U.S.C. 154(b) by 481 days.

(21) Appl. No.: 14/820,993

(22) Filed: Aug. 7, 2015

(65) Prior Publication Data
US 2016/0097872 A1 Apr. 7, 2016

Related U.S. Application Data

(60) Provisional application No. 62/059,271, filed on Oct. 3, 2014.

(51) Int. Cl.
*G01V 1/38* (2006.01)
*G02B 6/44* (2006.01)
(Continued)

(52) U.S. Cl.
CPC ............ *G01V 1/3808* (2013.01); *G01P 15/18* (2013.01); *G01V 1/18* (2013.01); *G01V 1/226* (2013.01); *G02B 6/4427* (2013.01); *H04B 10/2504* (2013.01); *G01V 1/188* (2013.01); *G01V 2210/1427* (2013.01); *G02B 6/443* (2013.01)

(58) Field of Classification Search
CPC ........ G02B 6/4427; G02B 6/443; G01V 1/18; G01V 1/226; G01V 1/188; G01V 1/3808; G01V 2210/1427; H04B 10/2504; G01P 15/18
See application file for complete search history.

(56) References Cited

U.S. PATENT DOCUMENTS

| | | | |
|---|---|---|---|
| 4,042,723 A * | 8/1977 | Presby | G01B 11/105 427/8 |
| 4,367,967 A | 1/1983 | Albert, Jr. | |

(Continued)

FOREIGN PATENT DOCUMENTS

| | | |
|---|---|---|
| EP | 2908162 | 8/2015 |
| GB | 2051398 | 1/1981 |

(Continued)

OTHER PUBLICATIONS

Arkema Innovative Chemistry, "Paints and coatings / Delivering Innovative Products and Services to Coatings Formulators Worldwide," Arkema Innovative Chemistry, www.arkema.com, 12 pgs, [retrieved on Jul. 18, 2014 from the Internet <URL: http://www.arkema.com/export/shared/.content/media/downloads/products-documentations/coatings/arkema-global-coatings-offer-2014.pdf>].

(Continued)

*Primary Examiner* — Krystine E Breier (57) ABSTRACT

According to one example, a floodable sensor station is coupled to an optical cable. The optical cable may be floodable. The floodable sensor station may connect floodable optical cables as part of a permanent reservoir monitoring system. The floodable optical cable may house a plurality of floodable optical fiber conduits. The floodable sensor station may be pressure-balanced with its surrounding environment in high-pressure marine depths of 1500 meters or more.

21 Claims, 7 Drawing Sheets

(51) Int. Cl.
*G01V 1/18* (2006.01)
*H04B 10/25* (2013.01)
*G01V 1/22* (2006.01)
*G01P 15/18* (2013.01)

(56) References Cited

U.S. PATENT DOCUMENTS

| | | | |
|---|---|---|---|
| 6,314,056 B1 | 11/2001 | Bunn et al. | |
| 6,606,186 B2 | 8/2003 | Maas | |
| 7,167,412 B2 | 1/2007 | Tenghamn | |
| 7,222,534 B2 | 5/2007 | Maas et al. | |
| 7,447,113 B2 | 11/2008 | Martinez et al. | |
| 7,660,206 B2 * | 2/2010 | Berg | G01V 1/201 367/188 |
| 7,671,598 B2 | 3/2010 | Ronaess et al. | |
| 8,149,647 B2 * | 4/2012 | Borgen | G01V 1/38 367/15 |
| 8,424,847 B2 | 4/2013 | Scott | |
| 8,611,180 B2 | 12/2013 | Berg et al. | |
| 8,645,071 B2 | 2/2014 | Fernihough | |
| 9,103,713 B2 | 8/2015 | Launay et al. | |
| 2003/0011878 A1 | 1/2003 | Maas et al. | |
| 2004/0013040 A1 * | 1/2004 | Maas | G01V 1/22 367/140 |
| 2009/0250241 A1 * | 10/2009 | Galletti | H01B 3/47 174/110 SR |
| 2010/0226203 A1 | 9/2010 | Buttle et al. | |
| 2012/0250457 A1 | 10/2012 | Rickert et al. | |
| 2013/0028051 A1 | 1/2013 | Barkved et al. | |
| 2014/0046599 A1 | 2/2014 | Smith et al. | |
| 2014/0112094 A1 | 4/2014 | Fernihough | |
| 2014/0160885 A1 | 6/2014 | Tenghamn | |
| 2014/0185409 A1 | 7/2014 | Voldsbekk | |
| 2014/0185410 A1 | 7/2014 | Voldsbekk | |
| 2014/0185411 A1 | 7/2014 | Voldsbekk | |
| 2014/0185412 A1 | 7/2014 | Voldsbekk | |
| 2014/0238773 A1 | 8/2014 | Sallas et al. | |
| 2014/0254310 A1 | 9/2014 | Voldsbekk | |

FOREIGN PATENT DOCUMENTS

| | | | |
|---|---|---|---|
| JP | 08-234067 A | 9/1996 | |
| JP | 08234067 A * | 9/1996 | G02B 6/4427 |
| WO | 2012140179 | 10/2012 | |

OTHER PUBLICATIONS

DuPont—Hytrel HTR8351 NC021 (Preliminary Data), "Thermoplastic Polyester Elastomer", DuPont, www.dupont.com, Revised Oct. 8, 2013, 2 pgs., [retrieved on Jul. 18, 2014 from the Internet <URL: http://dupont.materialdatacenter.com/profiler/material/pdf/datasheet/HytrelHTR8351NC021>].

Crompton Corp., "Polymer Modifiers—Polybond 3200 Chemically Modified Polyolefin," Crompton—Olefins & Styrenics, www.cromptoncorp.com, Revised Oct. 5, 2004, 2 pgs.

Crompton Corp., "Polymer Modifiers—Polybond 3000 Chemically Modified Polyolefin," Crompton—Olefins & Styrenics, www.cromptoncorp.com, Revised Oct. 5, 2004.

U.S. Appl. No. 14/452,211, filed Aug. 5, 2014, Titled: "Subsea Cable Having Floodable Optical Fiber Conduit" (16 pgs).

European Search Report for related EP Application No. 15187662.0, dated Feb. 24, 2016 (7 pgs).

* cited by examiner

FLOODABLE OPTICAL APPARATUS, METHODS AND SYSTEMS

CROSS-REFERENCE TO RELATED APPLICATIONS

This application claims priority to U.S. Provisional Application No. 62/059,271, filed Oct. 3, 2014, which is incorporated by reference.

BACKGROUND

Optical fibers are commonly employed for communicating data at high bandwidths. The investments to develop fiber optic communications technology have focused on making such bandwidths available over long distances. The long distances further necessitate producing cables that are simultaneously affordable and robust.

Fiber Optic cables typically must resist not only the traumas associated with transport and installation, but also the insidious effects of aging and long-term exposure to the elements, including environmental contaminants. One such example in a marine environment is referred to as the hydrogen darkening effect. Over a long exposure time, hydrogen, whether arising from corrosion, biological processes, or other marine-related causes, may diffuse into a core of an optical fiber and may react chemically with silicon, dopants, and/or other impurities to "tint" the optical signal-carrying material, such as glass. Over long distances the optical signal may be overwhelmed by the tint, resulting in excessive optical signal attenuation.

Permanent (hydrocarbon) reservoir monitoring (PRM) is a technique where multiple three-dimensional seismic "pictures" of the state of a hydrocarbon reservoir are taken such that a geologist or reservoir engineer may plan the location of additional boreholes for increasing the efficiency of the hydrocarbon extraction and/or may assess the efficiency of the current extraction techniques over time. In some cases, taking multiple seismic pictures of a hydrocarbon reservoir may be referred to as four-dimensional (4D) seismic.

Marine-based PRM faces significant challenges that are not faced by land-based reservoir monitoring systems. This is particularly true of ocean bottom installations as water depths extend into the 1000 meter range and beyond.

DETAILED DESCRIPTION

This disclosure is related generally to the field of marine seismic surveying and/or monitoring. For example, this disclosure may have applications in marine seismic surveying and/or monitoring, in which one or more seismic sources may be used to generate wavefields that interact with subsurface formations, and seismic sensors—either towed or ocean bottom—receive seismic energy generated by the seismic sources, or naturally occurring seismic events, and affected by the interaction with the subsurface formation. "Seafloor" and "ocean bottom", as used herein, refer to a floor of a body of water, such as an ocean, a sea, or a lake, for example, whereas "subsea" refers to being under the surface of the body of water, possibly at or near the floor. The body of water can be a salt-water body of water, a fresh-water body of water, or a brackish body of water.

The standard design approach to protect optical fibers from hydrogen darkening and marine-related degradation mechanisms involves routing optical fiber conduits through optical cables having hermetically sealed stainless steel or polymeric tubing (referred to herein as "hermetically sealed optical fiber conduit(s)"). As used herein, hermetically sealed optical fiber conduits are intended to mean optical fiber conduits that are sealed to prevent or at least reduce the likelihood of penetration by environmental elements, such as contaminants and water. For example, a hermetically sealed optical fiber conduit may be constructed in such a manner as to prevent a liquid in a surrounding environment from contacting the contents of the optical cable. In this example, the stainless steel or polymeric tubing may be coated to provide a redundant seal against liquid penetration, particularly in deep, high-pressure marine applications. High-pressure, as may exist in some marine environment fiber optic applications, can cause an increase in the diffusion of hydrogen to react chemically with silicon, dopants or other contaminants in the core of an optical fiber and advance the damaging effects described above. For example, in contrast to the standard atmospheric pressure at sea level of about 101.3 kilopascals, at depths in a marine environment the external environmental pressure of the surrounding water may increase to a pressure of about 5,127 kilopascals at a depth of 500 meters, and can increase to about 15,179 kilopascals at a depth of 1500 meters.

The marine seismic surveying and/or monitoring industry has leveraged fiber optic technology for cables buried on land and marine cables. Optical-communication-based seismic survey cables and seafloor cables typically employ commercially available fiber optic cables and technology as the backbone of system designs. Despite increased manufacturing complexity and/or materials costs associated with the standard design approach, the aforementioned precautions against exposing the optical fibers to water have become accepted practice in the marine seismic surveying and/or monitoring industry.

In contravention to the above standard industry practice, embodiments of the present disclosure allow for the surrounding water in a marine environment to enter optical fiber conduits, optical cables that house the optical fiber conduits, and sensor stations that connect the optical cables and the optical fiber conduits together. As such, these optical fiber conduits, optical cables and sensor stations are referred to as "floodable". Thus, as used herein, "floodable" is intended to mean an apparatus which is designed to passively or actively allow a liquid in the surrounding environment, such as a marine environment, to penetrate to an interior of the apparatus and contact the contents of the interior. In at least one embodiment, a floodable sensor station is provided which is designed to actively allow a liquid in the surrounding environment, such as a marine environment, to penetrate to an interior of the floodable sensor station and contact the contents of the interior. As used herein, optical fiber conduits, optical cables, sensor stations, housings, devices and/or components to a system are described. Each may be referred separately as an "apparatus". The term "system" as used herein is intended to mean one or more apparatus coupled together to achieve a particular function.

In at least one embodiment, a floodable sensor station is provided to allow seawater to penetrate its interior and to contact the contents therein. These contents may include sensors, analog-to-digital converters, the optical cables coupled to the sensor station, and optical fiber conduits housed in the optical cables. In this manner, the floodable sensor station may contribute to a "pressure-balanced" apparatus, including system connections and/or configurations in the high-pressure marine environments described above. As used herein, the term "pressure-balanced" is intended to mean that a substantially similar amount of pressure is provided outward from an interior of the apparatus toward an exterior (also referred to as internal pressure) as an amount of pressure that exists inward from an exterior of the package toward an interior (also referred to as external pressure). As used herein, "substantially similar" when used to compare two measurable values indicates that the second measurable value is within 90% to 110% of the first measurable value.

As defined above and used herein, the term "pressure-balanced" is intended to be differentiable from the term "pressure-tolerant" and/or "water-tolerant". The term pressure-tolerant, as used herein, is intended to refer to an apparatus's capability to function in its intended manner and withstand increased pressure from an exterior or external environment and to reduce the likelihood of increased pressure leading to damage of the apparatus. The term water-tolerant, as used herein, is intended to mean the purposeful construction of an apparatus to prevent or reduce the likelihood that a apparatus's contact with water will lead to the damage of the apparatus or such that contact with water will produce only a non-detrimental impact to or reduction in the apparatus's function and intended use.

Further, the floodable intent in the design and construction of the apparatus may allow for less complexity and material costs in the manufacture, assembly and deployment of such optical-communication-based seismic surveying and monitoring equipment.

As will be described further herein, in some embodiments, the optical cables and the optical fiber conduits themselves are constructed in a floodable manner to facilitate entry of seawater to the sensor station in deployment and to create the pressure-balance. In some embodiments, hermetically sealed optical fiber conduits are used together with floodable optical fiber conduits. Embodiments, however, are not so limited to this example.

In some embodiments, a floodable sensor station is provided for permanent reservoir monitoring (PRM). The floodable sensor station, connecting optical cables that are housing optical fiber conduits, may provide a permanent reservoir monitoring system with a projected operable subsea life-span in the range of 20-25 years or more. At least one embodiment, usable for PRM among other potential implementations, can include a floodable optical cable coupled to a floodable sensor. In some embodiments, a hermetically sealed optical cable and/or hermetically sealed optical fiber conduit is coupled to the floodable sensor station. The various embodiments described herein that utilize floodable optical cables, floodable optical fiber conduits, and/or floodable sensor stations, may yield substantial savings in manufacturing, deployment, and/or maintenance costs, among other benefits.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more". Furthermore, the words "can" and "may" are used throughout this application in a permissive sense (i.e., having the potential to, being able to), not in a mandatory sense (i.e., must). The term "include," and derivations thereof, mean "including, but not limited to." The terms "coupled" and "coupling" are intended to mean directly or indirectly connected physically or in signal transmission, as may be appropriate to the context.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure and should not be taken in a limiting sense.

Figure 1:
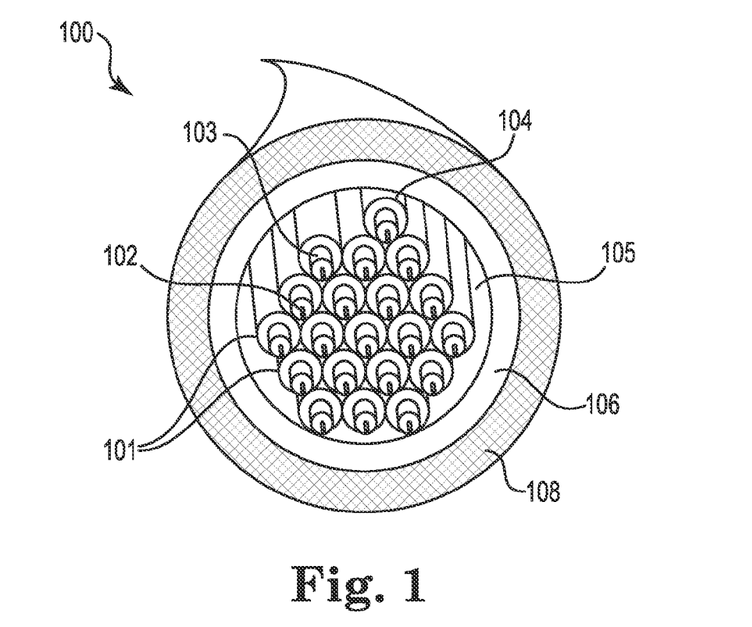
FIG. 1 illustrates a cross-section of an example of a hermetically sealed optical fiber conduit consistent with use in an apparatus according to one or more embodiments of the present disclosure.

FIG. 1 illustrates a cross-section of an example of a hermetically sealed optical fiber conduit 100 consistent with use according to one or more embodiments of the present disclosure. The example of a hermetically sealed optical fiber conduit 100 shown in FIG. 1 illustrates twenty optical fibers 101 carried within an interior 105 of a stainless steel tube 106 having an external waterproof layer 108. More or fewer than twenty optical fibers may be housed within the hermetically sealed optical fiber conduit 100. Embodiments are not limited to the number shown in this example. In this example, the stainless steel tube having the external waterproof layer 108 create the "hermetic seal" to the hermetically sealed optical fiber conduit 100. In other words, the optical fibers 101 can be protected by being hermetically sealed within the stainless steel tube 106 and the external waterproof layer 108.

Each of the optical fibers 101 within the hermetically sealed optical fiber conduit 100 is shown to include a core 102 formed from a core material, such as glass, to carry optical signals. Cladding 103 formed from a cladding material, such as glass with a lower index of refraction than the core material, is shown disposed around an outside surface of the core 102. And, a coating 104 formed from a coating material, such as an acrylate plastic, is shown disposed around an outside surface of the cladding 103. Acrylate plastic refers to a family of synthetic plastic materials containing one or more derivatives of acrylic acid. Core 102, cladding 103, and coating 104 may be formed of any materials suitable for optical fiber cores, optical fiber cladding, and optical fiber coating, respectively, such as those commonly known and used in the industry.

In some embodiments, the optical fibers 101 can each be single-mode, low water peak, 250 micrometer diameter, dual acrylate optical fibers compliant with International Telecommunications Union (ITU) standard ITU-T G.652.D. In some embodiments, the interior 105 is filled with a gel. The gel may be a water-blocking gel and can fill at least 85% of the interstitial volume of the interior 105. The gel may include carbon or other dopants to capture available hydrogen before it diffuses into the optical fiber. In some embodiments, the stainless steel tube 106 can consist of 316L stainless steel with an outer diameter of about 2 millimeters and a wall thickness in the range of 50-200 micrometers. The external waterproof layer 108 can provide a redundant seal against imperfections in the stainless steel tube 106. The external waterproof layer 108 can be a sheath of a high density polyethylene (HDPE) with a PolyBond™ additive, or another compatibilizing agent. The external waterproof layer 108 may lower the interfacial surface energy to promote bonding with the metal of the stainless steel tube 106, and may include an optional colorant, giving the hermetically sealed optical fiber conduit 100 a total outer diameter of approximately 3.0 millimeters. In some embodiments, the optical fibers 101 may be provided with 0.1% or more excess length relative to the length of the stainless steel tube 106 to accommodate differing strains on the various conduit materials.

As mentioned above, optical cables housing optical fiber conduits may be deployed in a number of underwater environments, including subsea applications such as PRM. In such applications, there may be water exposure to the optical cables and/or optical fiber conduits for relatively long periods of time, such as many months or years. In particular, PRM systems may be designed for decades of operation in water at depths which may be deeper than 1500 meters, for example. However PRM systems may also be deployed and used in more shallow depths. In such high-pressure marine environments, an apparatus may use gel-filled stainless steel conduits to house the optical fibers and to provide robust hermetic seals at every connection and each splice, for example, for the connection of optical fibers to a plurality of optical components in an optical seismic sensor package.

As used herein, an optical seismic sensor package is intended to mean an assembly of a plurality of optical apparatus for use in seismic sensing. For example, one or more of a plurality of optical apparatus may be connected and arranged in an interior of a sensor box (referred to herein as a first part of the optical seismic sensor package) and one or more of the plurality of optical apparatus may be connected and arranged in relation to an exterior of the sensor box (referred to herein as a second part of the optical seismic sensor package). The plurality of optical apparatus for use in seismic sensing may include optical components such as optical fibers within optical fiber conduits within optical cables. The plurality of optical apparatus can further include an optical interferometer device (also referred to as interferometer optics), a three axis optical accelerometer, a splice module, a splice management tray, an optical telemetry block, and an optical hydrophone, among other possible optical apparatus for use in seismic sensing. For example, an optical hydrophone may be connected to an exterior of the sensor box (second part of the optical seismic sensor package) and the three axis optical accelerometer may be connected to an interior of the sensor box (first part of the optical seismic sensor package) as part of an optical seismic sensor package. The optical fibers may be spliced to connect and to communicate optical signals between the optical interferometer, optical accelerometer, and optical hydrophone within the optical seismic sensor package and housed within a sensor station.

Previously, a sensor station to house an optical seismic sensor package in a marine environment would have been purposefully constructed to provide a water-tight enclosure for plurality of optical apparatus in order to protect the apparatus from exposure to water and/or to withstand high pressure in deep water.

The connections and combinations of optical fibers housed within optical fiber conduits, optical cables, and sensor stations to a PRM system may number in the hundreds and possibly the thousands. Thus, each hermetic seal in a hermetically sealed optical fiber conduit represents a cost, a time investment, and a potential failure point for the system. Where the number of such seals can be reduced, along with the associated costs and failure point risks, manufacturing lead times can be reduced, resulting in improved manufacturing efficiencies.

Embodiments of the present disclosure capitalize on the fact that for short lengths of optical fiber, such as on the scale of meters to a few kilometers, water exposure and the diffusion of hydrogen leading to hydrogen darkening effect may not be a root cause of failure. That is, the hydrogen darkening and marine-related degradation mechanisms are not a major concern as long as a length of exposed optical fiber is kept relatively short. For example, in some embodiments, an exposed optical fiber length may be in a range from about 1 meter or less up to about 2 kilometers, depending on the application.

Over such lengths, the hydrogen darkening may have a relatively negligible effect, even if it occurs. Further, at the low temperatures typically encountered at depths where many PRM systems are deployed, such as those below 500 meters depth, a thermocline may cause surrounding water temperatures to only be around 0-4 degrees Celsius. At such low temperatures, hydrogen diffusion may occur so slowly that little or no discernable hydrogen darkening may be expected to occur over the 20-25 year life-span of a PRM system. Additionally, in the operating environment for PRMs, it is noted that low levels of available hydrogen in the surrounding seawater may make hydrogen darkening even less of a concern.

Figure 2:
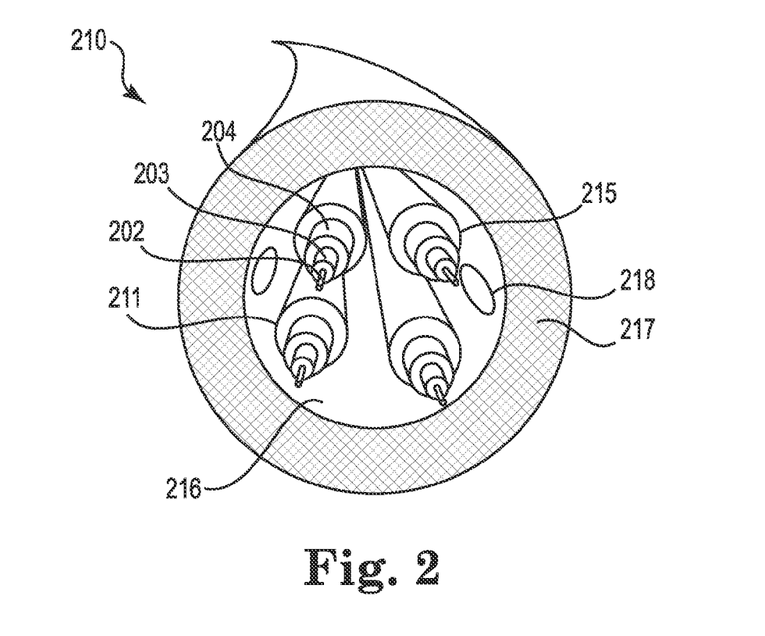
FIG. 2 illustrates a cross-section of an example of a floodable optical fiber conduit consistent with use in an apparatus according to one or more embodiments of the present disclosure.

FIG. 2 illustrates a cross-section of an example of a floodable optical fiber conduit 210 consistent with use according to one or more embodiments of the present disclosure. The floodable optical fiber conduit 210 shows, by way of example, four optical fibers 211 carried within an interior 216 of an outer tube 217. In at least one embodiment, the floodable optical fiber conduit 210 has a loose plastic outer tube 217. According to embodiments, the floodable optical fiber conduit 210 is not filled with a gel, such as a water-proof gel. Instead, the floodable optical fiber conduit 210 may have a plurality of fluidic passages (for example, periodic openings piercing entirely through the outer tube 217 of the floodable optical fiber conduit 210, or interconnected partial piercings) to permit a flow of a fluid, such as sea water, between the interior 216 and an exterior of the floodable optical fiber conduit 210. As used herein, openings which pierce entirely through a wall of a material, or which interconnect to provide a fluid passageway, are referred to as "vents". Hence, the example embodiment of FIG. 2 illustrates a plurality of vents 218 to provide fluid communication of a liquid, such as sea water, between the interior 216 and an exterior of the floodable optical fiber conduit 210. In some embodiments, the vents 218 may be optional since flooding to provide fluid communication between an exterior and the interior 216 of the floodable optical fiber conduit 210 may alternatively and/or additionally be enabled from unsealed ends of the floodable optical fiber conduit 210. Additionally, other designs may be constructed and/or provided elsewhere in relation to the floodable optical fiber conduit 210 to enable flooding of the optical fibers 211 housed therein.

Figure 4:
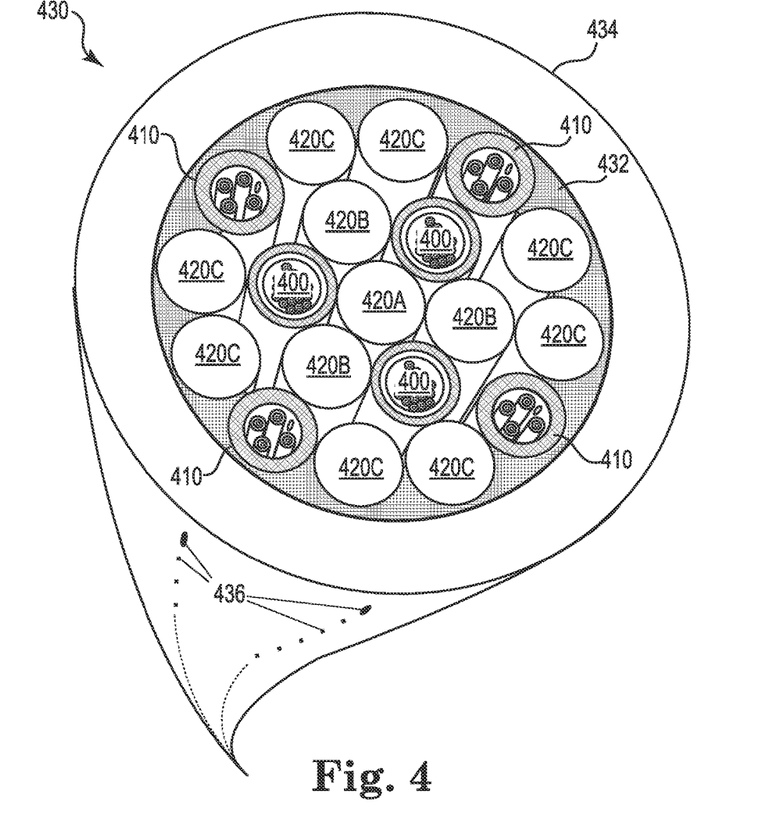
FIG. 4 illustrates a cross-section of an example of a floodable optical cable housing floodable optical fiber conduits consistent with use in an apparatus according to one or more embodiments of the present disclosure.

It is noted that because the floodable optical fiber conduit 210 and floodable optical cable, discussed and shown at 430 in FIG. 4, are floodable in a marine environment, they may be pressure-balanced at high-pressured operating environments of PRM systems. Further, since they can be pressure-balanced in such environments, the outer tube, 217 in FIG. 2, can be formed from a less rigid and costly material, such as plastic, than the stainless steel tube shown as 106 in FIG. 1 with its associated external waterproof layer 108. As a result, the process of assembling the optical fibers 211 in the floodable optical fiber conduit 210, as well as placing the floodable optical fiber conduits within a floodable optical cable or other housing, as well as the process of connecting the plurality of optical apparatus associated with seismic sensors to the optical fibers may be simplified relative to the use of a more rigid and costly outer tube, such as a stainless steel tube, for housing optical fibers and/or optical fiber conduits.

In the embodiment of FIG. 2 each of the optical fibers 211 within the floodable optical fiber conduit 210 is shown to include a core 202 formed from a core material, such as glass, to carry optical signals. Cladding 203 formed from a cladding material, such as glass with a lower index of refraction than the core material, is disposed around an outside surface of the core 202. And, a coating 204 formed from a coating material, such as an acrylate plastic, is disposed around an outside surface of the cladding 203.

In contrast to the hermetically sealed optical fiber conduit 100 described in connection with FIG. 1, the embodiment of FIG. 2 shows the optical fibers 211 of the floodable optical fiber conduit 210 may each include a tight buffer 215. As used herein, a "tight buffer" or "tight buffered" is intended to mean there is present a material disposed around an outside surface of a component, such as the tight buffer 215 to the coating 204 of each optical fiber 211 in FIG. 2. Thus, the term "tight buffer" or "tight buffered" is intended to mean the presence of a layer of material to conform to an outer surface of a component, whether a coating 204 to an optical fiber 211 or other component. In various embodiments, the tight buffer, such as the tight buffer 215 to the coating 204 of the optical fiber 211 in FIG. 2, can be adhered in a fashion that resists separation from the outer surface of the component. Thus, in the example embodiment of FIG. 2, the tight buffer 215 is selected and designed to adhere to the coating 204 of the optical fiber 211 in the presence of sea water. Examples of a tight buffer material for use in a PRM operating environment may be appropriately chosen from conformal polymers that mitigate the effect of water molecule diffusion. Thus, as defined above, such a tight buffer may contribute to a component being water-tolerant.

With the addition of the tight buffer 215 shown in the example embodiment of FIG. 2, the optical fibers 211 shown therein can be referred to as tight buffered optical fibers 211. In various embodiments, the tight buffer 215 shown in FIG. 2 may be a material that includes at least one of a thermoplastic elastomer and/or a thermoplastic fluoropolymer. For example, the material of the tight buffer 215 may be polymeric, using a thermoplastic elastomer, such as Hytrel® from DuPont, or a thermoplastic fluoropolymer, such as Kynar® polyvinylidene fluoride (PVDF) from Arkema, both of which offer tight conformal coatings that resist delamination. Both of these materials are stable in water (chemically benign), while PVDF displays lower hydrogen permeability. Colorants may be added to the tight buffer material to make the tight buffered optical fibers 211 readily distinguishable.

In some embodiments, the tight buffered optical fibers 211 can be single-mode, low water peak optical fibers compliant with ITU standard ITU-T G.657.A1, having an outer diameter of the coating 204, such as acrylate plastic, of 250 micrometers and an outer diameter of the tight buffer 215 of 500 to 900 micrometers.

In some embodiments, the outer tube 217 for the floodable optical fiber conduit may be a loose plastic outer tube. Such a loose plastic outer tube 217 can be formed from polypropylene and/or PVDF with an outer diameter of about 3.0 millimeters and an inner diameter of about 2.0 millimeters. Colorants may be included to make a plurality of such floodable optical fiber conduits 210 readily distinguishable from each other and/or from combination within an optical cable with hermetically sealed optical fiber conduits. The tight buffered optical fibers 211 may be provided with 0.1% or more excess length relative to the length of the outer tube 217 to accommodate differing strains of the various conduit materials and apparatus.

When exposed to water, tight buffered optical fibers 211 coated with an appropriately chosen conformal polymer, e.g., having a tight buffer 215, can mitigate the effects of water molecule diffusion. By contrast, with unprotected optical fibers, water molecules may expand pre-existing surface flaws and lead to failure of the optical fiber by causing crack propagation in a fashion similar to water freezing and expanding a crack within a cement surface. In the example embodiment of FIG. 2, the tight buffer coating resists delamination to remain adhered to the tight buffered optical fibers 211, making them water-tolerant and thereby reducing the likelihood of water molecule diffusion leading to such above described failures. In one example, as water diffuses through the polymeric material of the tight buffer 215 and into the coating 204, a silicate layer may form on an outside surface of the glass of the cladding 203 and/or the core 202. In some instances, the silicate may not migrate. Instead the formed silicate may remain conformal with an inside surface of the tight buffer 215. And, in result, the formed silicate may block further diffusion of other water molecules. Thus, the tight buffer 215 shown in FIG. 2 may notably reduce mechanical degradation caused by crack growth.

Figure 3:
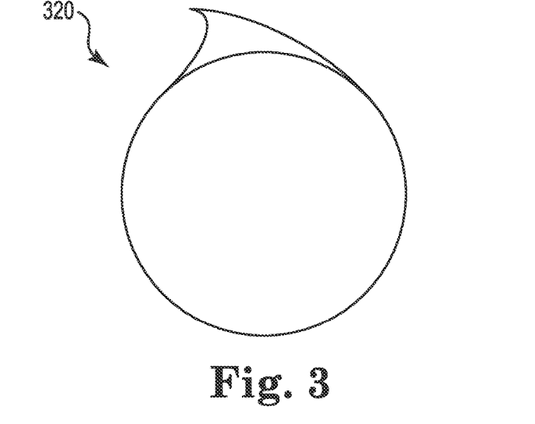
FIG. 3 illustrates a cross-section of an example of a strength member consistent with use in an apparatus according to one or more embodiments of the present disclosure.

FIG. 3 illustrates a cross-section of an example of a strength member 320 consistent with use according to one or more embodiments of the present disclosure. In embodiments, the strength member 320 can be a steel wire formed from high-strength steel with an outer diameter of about 3.2 millimeters. The steel wire may be galvanized for corrosion resistance or may alternatively or in addition be provided with a Galfan® coating. The steel wire can function as a long-lived flexible strength member 320 and in some embodiments may be replaced with other wire and/or strand materials that provide adequate strengths, and some embodiments may include strength members that are hollow or have noncontiguous cross-sections. Suitable materials may include other metals, polymers, and/or natural fibers, among others.

FIG. 4 illustrates a cross-section of an example of a floodable optical cable 430 having an outer cable jacket 434. The outer cable jacket 434 of the floodable optical cable 430 is shown housing a plurality of floodable optical fiber conduits 410, a plurality of strength members, (420A, 420B and 420C), and a plurality of hermetically sealed optical fiber conduits 400 consistent with use according to one or more embodiments of the present disclosure. FIG. 4 shows an example embodiment of a floodable optical cable 430 enclosing three strand layers, including a center layer consisting of a strength member 420A. Around the center strength member 420A is a middle layer that has six strands in the illustrated embodiment. The middle layer has three strength members 420B interspersed with three hermetically sealed optical fiber conduits 400. In some embodiments, the middle layer is wound helically around the center layer. Around the middle layer is an outer layer that has twelve strands in the illustrated embodiment. The outer layer has eight strength members 420C interspersed with four floodable optical fiber conduits 410. In some embodiments, the outer layer is contra-wound helically around the middle layer. Embodiments, however, may have more or fewer layers and numbers of strands of each type in each layer than shown in the example embodiment of FIG. 4.

The relative winding pitches may be chosen to provide torque balancing between the layers. For example, two out of every three of the outer layer strands can be strength members 420C, and the third of every three outer layer strands can be a floodable optical fiber conduit 410. Alternative embodiments may include other combinations and configurations of hermetically sealed optical fiber conduits 400, floodable optical fiber conduits 410, and strength members 420 within the floodable optical cable 430. The various combinations and configurations of strands just described can be enclosed in an outer cable jacket 434. In some embodiments, the outer cable jacket 434 can be formed from a HDPE material.

As such, a floodable optical fiber conduit 410 can, in various embodiments, be positioned within an interior wall of the outer cable jacket 434 of the floodable optical cable 430. In some embodiments, the floodable optical fiber conduit 410 can be positioned adjacent to the interior wall of the floodable optical cable 430. That is, the floodable optical fiber conduits 410 can be positioned radially outward relative to the hermetically sealed optical fiber conduits 400.

An outer tube (such as 217 illustrated in FIG. 2) of the floodable optical fiber conduit 410 can have vents there through (such as 218 illustrated in FIG. 2), to enable flooding of the floodable optical fiber conduit. Strength members 420, such as galvanized steel wires, also can be positioned, in various embodiments, within the interior wall of the floodable optical cable 430. Moreover, hermetically sealed optical fiber conduits 400 also can be positioned, in various embodiments, within the interior wall of the floodable optical cable.

In some embodiments, the outer cable jacket 434 can have periodic vents 436 to provide fluid communication between an exterior and an interior of the floodable optical cable 430. That is, the outer cable jacket 434 can have vents there through, an embodiment of which is shown at 436, to enable flooding of the floodable optical cable 430. The vents 436 are optional because flooding to provide fluid communication between the exterior and the interior may alternatively and/or additionally be enabled from unsealed ends of the floodable optical cable 430 and/or anywhere else openings are made to enable access to the hermetically sealed optical fiber conduits 400 and/or the floodable optical fiber conduits 410. When vents 436 are provided in the outer tube of the floodable optical fiber conduit 410 and/or outer cable jacket 434 of the floodable optical cable, the vents are sized and shaped as suitable to providing free flooding at an appropriate rate according to desired deployment specifications and to enable fluid communication between the exterior and the interior of the outer tube and/or the outer cable jacket 434.

A polymeric bedding layer 432 may be disposed around an interior wall of the floodable optical cable 430 to extend into interstices between the floodable optical fiber conduits 410 and the strength members 420. That is, the polymeric bedding layer 432 may enclose the outer strand layer by being formed on the interior surface of the outer cable jacket 434 and extending into interstices between the outer layer strands to, for instance, provide additional crush resistance to the floodable optical cable 430 and/or to reduce flex-induced bearing forces exerted by the strength members 420 on the floodable optical fiber conduits 410. When vents 436 are provided in the outer cable jacket 434, the vents 436 may also penetrate the polymeric bedding layer 432.

By way of example, the floodable optical cable 430 shown in FIG. 4 encloses twelve strength members 420, three hermetically sealed optical fiber conduits 400, and four floodable optical fiber conduits 410. The four floodable optical fiber conduits 410 each contain four tight buffered optical fibers 211, as described with regard to FIG. 2, and the three hermetically sealed optical fiber conduits 400 each contain twenty optical fibers coated only with acrylate plastic, as described with regard to FIG. 1. However, embodiments are not limited to a particular number of strength members, hermetically sealed optical fiber conduits, optical fibers coated only with acrylate plastic, floodable optical fiber conduits, and/or tight buffered optical fibers.

Accordingly, the present disclosure describes, in various embodiments, a floodable optical fiber conduit and a tight buffered optical fiber positioned within an interior wall of the floodable optical fiber conduit. As described herein, the tight buffered optical fiber can include a core material to carry optical signals, a cladding material with a lower index of refraction than the core material that is disposed around an outside surface of the core material, a coating material, such as acrylate, disposed around an outside surface of the cladding material, and a tight buffer material disposed around an outside surface of the coating material.

FIG. 4 illustrates the hermetically sealed optical fiber conduits 400 positioned radially inward relative to the floodable optical fiber conduits 410. The inner hermetically sealed optical fiber conduits 400 may be formed with a coated stainless steel tube, as described with regard to FIG. 1, and can be terminated at connections that are water-tight in deep water at high pressure so as to provide a "long-haul" conduit for many optical fibers that can be fed by a system of optical telemetry residing mainly within cable end terminations of cable sections, as described with regard to FIG. 5, and potentially with some connections in sensor stations.

As described herein, the floodable optical fiber conduits 410 can be allowed to free-flood with seawater when deployed. As these floodable optical fiber conduits 410 are free-flooded, they can be pressure-balanced such that there is little or no differential pressure between an interior and an exterior of the floodable optical fiber conduits 410 in the subsea environment. This may enable a wider selection of lower cost materials and/or processing methods, along with reducing the number of high-pressure seals throughout the system.

However, the floodable optical fiber conduits 410 may not be as strong as the hermetically sealed optical fiber conduits 400. As described with regard to FIG. 2, the tight buffered optical fibers 211 contained within the floodable optical fiber conduits 410 may be different compared to the other optical fibers in the hermetically sealed optical fiber conduits 400, as described with regard to FIG. 1. For example, the tight buffered optical fibers 211 within the floodable optical fiber conduits 410 can include an additional extruded conformal light buffer formed from a thermoplastic elastomer and/or a thermoplastic fluoropolymer. These tight buffered optical fibers can facilitate "short haul" interconnection between sensor stations and/or connection to cable sections' cable end terminations.

Figure 5:
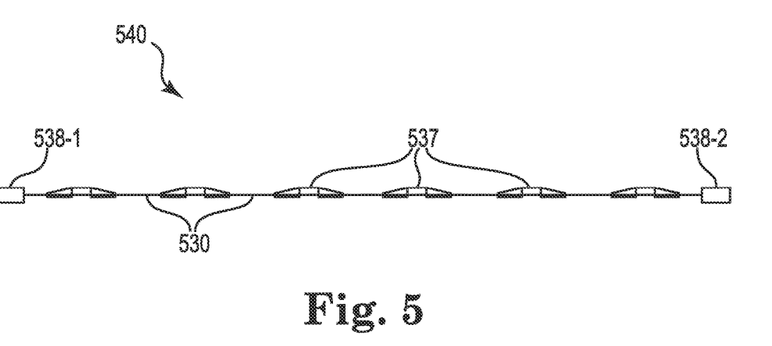
FIG. 5 illustrates an example of one or more floodable sensor stations and one or more floodable optical cables deployed in a permanent reservoir monitoring (PRM) system consistent with use according to one or more embodiments of the present disclosure.

FIG. 5 illustrates an example of a cable section 540 according to one or more embodiments of the present disclosure. In some embodiments, the cable section 540 can include a floodable optical cable 530, as described with regard to FIG. 4. A cable section 540 can have cable end terminations 538-1, 538-2 at each of its ends. Cable sections 540 can include a number of sensor stations 537 that may be mechanically and/or optically coupled along the length of cable section 540. In some embodiments, the cable section 540 can be a PRM cable section and may be approximately 2 kilometers long. In some embodiments there may be 10-30 sensor stations 537 spread at intervals along its length. However, other lengths and/or sensor station combinations are consistent with the present disclosure. A PRM cable may be deployed with a plurality of such cable sections 540 coupled together at the cable end terminations 538-1, 538-2.

Instrumented subsea cables have been used for ocean bottom and transition zone seismic surveying and also for reservoir monitoring applications. Such cables can be permanently deployed above oil reservoirs for PRM with the intention of acquiring and outputting four-component (4C) and/or four-dimension (4D) seismic data, as described herein, to enable improved reservoir management and increased yield.

Such PRM cables may be "electrical" in that they couple to sensor stations that transduce a parameter of interest into an electrical signal. Such signals may be digitized and/or multiplexed with self-contained electronics at the sensor station. Such PRM cables themselves may contain various electrical transmission lines and conductors that provide functionalities, such as delivery of power and recovery of data. Such PRM cables may be quite long and/or include several thousand sensor channels. The cost of deploying such PRM cables to the seafloor may be as high as the cost of the cables themselves. As such, it may be desirable for PRM cables to be extremely reliable for long time periods, such as 30 years. As an alternative, fiber optic cables may be used that transmit optically multiplexed signals, possibly from optical sensors. In some embodiments, such optical sensors may provide signals by interferometric processing. In some embodiments, such fiber optic cables and optical sensors may be fully fiber optic and/or may not include electrical components. Such systems may not use subsea electronics and, thus, can be completely "passive".

As described with regard to FIG. 1, optical fibers may have a single plastic coating, which may be an acrylate, that undergoes expansion. For instance, plastics may relax after processing and anything more than minimal expansion of an optical fiber's coating may cause micro-bending induced signal and/or strength attenuation. When submerged in water unprotected, water molecules may diffuse through the plastic coating and on contact with the optical fiber's glass may chemically react to form a silicate. If this silicate forms within a flaw in the surface of the glass, it may pry open the flaw as it forms. As with other brittle materials, the tensile strength of glass is may be impacted by the physical size of such flaws. Most affordable acrylates degrade and eventually disintegrate when submerged in water. As such, in the presence of an unprotected path to the glass, water molecules can rapidly escape to be replaced with more water molecules and, hence, crack propagation may be initiated and perpetuated, which may result in mechanical failure of the optical fiber.

As with water, hydrogen atoms can enter an optical fiber through diffusion. Hydrogen however, can diffuse directly into the glass core of an optical fiber and form a hydroxyl by bonding with silicon. This tinting process may undermine the optical properties of the glass, which may result in excessive signal attenuation. The tinting process may be driven by both hydrogen concentration and temperature. When subsea cables are very long (hundreds of kilometers), a small amount of hydrogen diffusion per unit length can cause marked signal attenuation.

Hence, subsea cables may be designed in such a way as to protect optical fibers from both the diffusion of water and hydrogen. The optical fibers may be contained within hermetically sealed steel tubes, as described with regard to FIG. 1, that form a component in the cross-section of a helical wound cable, as described with regard to FIG. 4. These hermetically sealed steel tubes can withstand the high pressures found at or near the seafloor. The interstitial space within these hermetically seated steel tubes may be filled with a hydrogen absorbing gel. As such, the optical fibers within may be protected from the diffusion of both water and hydrogen and may display reliable optical and mechanical properties. Such optical fiber conduit designs may be referred to as "steel loose tube" or "fiber in steel tube" (FIST). Protecting optical fibers from hydrogen and water may also include the use of cable end terminations, such as shown at 538-1, 538-2 in FIG. 5, or periodic break-outs associated with, for example, sensor stations that maintain a barrier that is water-tight in deep water at high pressure.

For applications like PRM, long subsea cables may sometimes be formed from cable sections 540 that are approximately 2-5 kilometers in individual length. At least some of these cable sections 540 may have sensor stations 537 disposed along their length, for example, at intervals of 50 meters. As such, in these situations, hundreds of such hermetically sealed steel tubes may be made in manufacture and hundreds of optical fiber splices with associated optical apparatus, such as optical sensors, couplers, filters, etc., may be made as either housed or encapsulated in such a way as to protect them from water contact. These approaches may be expensive and/or may involve a large time investment to fabricate.

In contrast, the present disclosure describes embodiments that may be less expensive and/or may be a quicker approach to building PRM cable and associated sensor stations. For instance, the present disclosure describes, in various embodiments, floodable sensor stations that can be free-flooded such that tight buffered optical fibers make contact with the seawater. That is, an interior of the floodable sensor station is in fluid communication with an exterior of the floodable sensor station to enable flooding of the floodable sensor station. As such, it may be that no hermetically sealed steel tubes are accessed in at least some sensor stations such that optical fiber splices can be made on hardware, such as a splice management tray described herein, that resides within the free-flooded sensor station.

Figure 6:
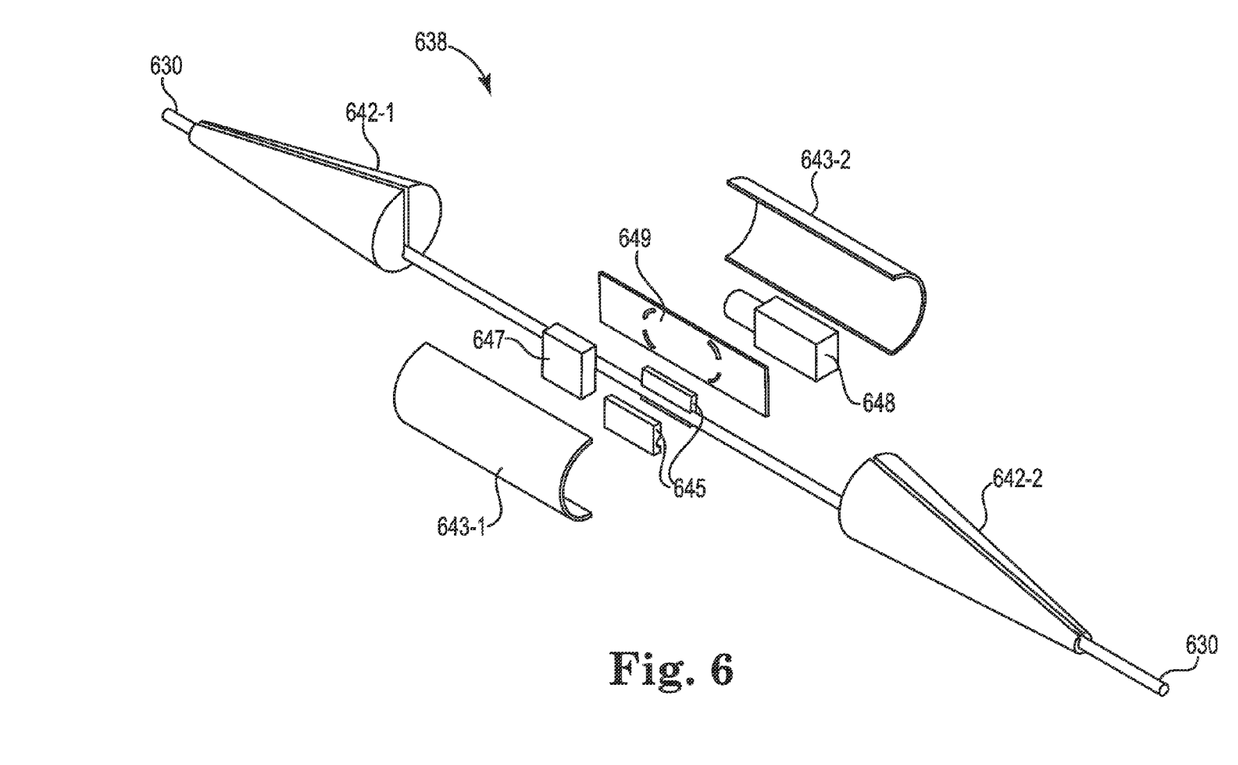
FIG. 6 illustrates an exploded view of an example of a portion of a floodable sensor station according to one or more embodiments of the present disclosure.
Figure 7:
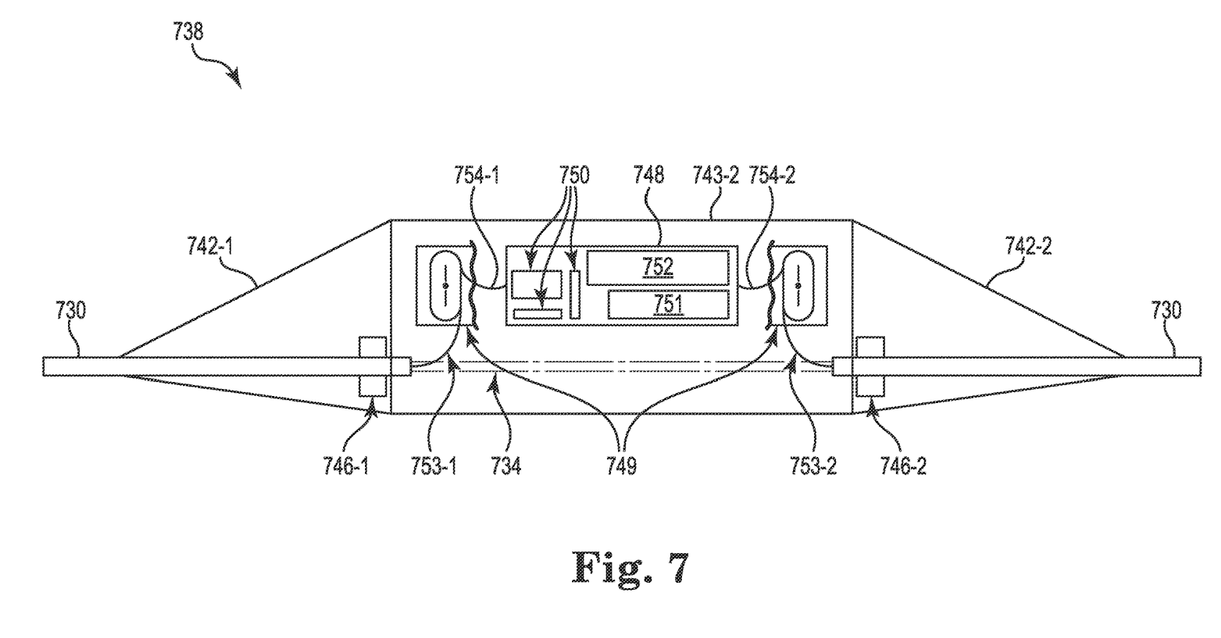
FIG. 7 illustrates an assembled cross-section view of an example of a portion of a floodable sensor station according to one or more embodiments of the present disclosure.

FIGS. 6 and 7 illustrate exploded and cross-section views, respectively, of a sensor station according to one or more embodiments of the present disclosure. As described herein, sensor stations can house electrical or passive optical sensors that can be utilized to sense parameters such as acceleration, motion, and/or pressure, among others. For instance, optical sensors can be used to sense seismic energy. The seismic energy may be naturally occurring, or may be imparted by a seismic source for the purpose of performing PRM, for example.

Sensing seismic energy can include detecting subsea motion and/or pressure change. Some seismic sensors, such as hydrophones, can detect seismic energy in the form of pressure changes under water. Some other seismic sensors, such as accelerometers, can produce signals related to a time derivative of velocity of detected motion, that is, acceleration. Optical seismic sensors can generate a respective optical signal in response to a detected physical parameter. The respective optical signals may result from, for example, a change in reflected wavelength, a change in phase or an interference pattern, produced by a passive interferometer, in response to changes in the physical parameter. The optical sensors utilized to sense parameters such as acceleration, motion, and/or pressure, among others, can be housed in sensor stations, as described herein, at or near the seafloor for PRM.

FIG. 6 illustrates an exploded view of an example of a portion of a floodable sensor station 638 according to one or more embodiments of the present disclosure. A floodable sensor station 638 can, in various embodiments, include a floodable optical cable 630, an optical telemetry block 647, an optical seismic sensor package 648, a splice management tray 649 to facilitate splicing of optical fibers, and the management of coils of the optical fibers, that couple the floodable optical cable 630, the optical seismic sensor package 648, and the optical telemetry block 647. As the reader will appreciate, telemetry is the highly automated communications process by which measurements are made and other data collected at remote or inaccessible points and transmitted to receiving equipment for monitoring. Hence the optical telemetry block 647 as used herein is an optical apparatus to optically communicate measurement and other data collection at the remote site of a floodable sensor station. The floodable sensor station 638 can further include a cable clamp 645 that can mechanically couple without adhesive to the floodable optical cable 630. As shown in FIG. 6, the floodable sensor station 638 can further include two case halves 643-1, 643-2 that can be closed around the optical telemetry block 647, the optical seismic sensor package 648, the splice management tray 649, a cable clamp 645, and two portions 642-1, 642-2 of a bending strain relief (BSR) member (bend stiffener) at each distal end of the floodable sensor station 638 with the floodable optical cable 630 passing therethrough.

Each of the portions 642-1, 642-2 of the BSR member can be mechanically connected to the two case halves 643-1, 643-2. Each of the two case halves 643-1, 643-2 can close around the splice management tray 649 to create a substantially cylindrical exterior and to create two internal hemi-cylindrical compartments. In some embodiments, the optical seismic sensor package 648 can be housed within one of the internal hemi-cylindrical compartments and the optical telemetry block 647 can be housed within another hemi-cylindrical compartment.

In some embodiments, the cable clamp 645 can be mechanically connected to the floodable optical cable 630 between the portions 642-1, 642-2 of the BSR member. The cable clamp 645 located as such can provide mechanical support to the floodable optical cable 630, the optical telemetry block 647, the optical seismic sensor package 648, and/or the splice management tray 649, among other components.

The floodable sensor station 638 can include free-floodable cavities. The floodable sensor station 638 can be utilized in association with PRM, in some instances. As such, the floodable optical cable 630, the optical telemetry block 647, the optical seismic sensor package 648, and/or the splice management tray 649, among other components, can be in contact with water. During PRM operations, the water may be high-pressure water. Accordingly, the floodable optical cable 630, the optical telemetry block 647, the optical seismic sensor package 648, and/or the splice management tray 649, among other components, each can be configured to be water-tolerant and pressure-tolerant to be resistant to damage potentially caused by exposure to water, in particular high-pressure water.

FIG. 7 illustrates a cross-section view of an example of a portion of a floodable sensor station 738 according to one or more embodiments of the present disclosure. Consistent with FIG. 6, the cross-section illustrated in FIG. 7 shows the free-floodable cavity enclosed by case half 743-2 (only 743-2 is shown and not 743-1 in this cross-section view) in which the optical seismic sensor package 748 is housed behind the splice management tray 749, which has a center section removed for ease of viewing the optical seismic sensor package 748.

The optical seismic sensor package 748 can be configured to be water-tight but pressure-tolerant to enclose the optical sensors housed within. In some embodiments, the optical seismic sensor package 748 can be configured for acquiring and outputting four-dimensional (4D-x, y, z, and time) and four-component (4C-sensor box, accelerometer, hydrophone, and interferometer optics and slice module compartment) seismic data. Accordingly, the optical seismic sensor package 748 can house a three-axis optical accelerometer 750, which can be an orthogonal array of three optical accelerometers, that is also configured to be pressure-tolerant. In some embodiments, the three-axis optical accelerometer 750 can be an orthogonal array of three interferometric optical accelerometers. In addition, the optical seismic sensor package 748 can house an optical hydrophone 751 that is also configured to be pressure-tolerant. In some embodiments, the optical hydrophone 751 can be an interferometric optical hydrophone. In some embodiments, the optical seismic sensor package 748 can house a splice module 752 configured to be pressure-tolerant to facilitate splicing of optical fibers that couple optical components within the optical seismic sensor package 748, such as the three-axis optical accelerometer 750 and the optical hydrophone 751, among other optical components.

The splice management tray 749 can be a pre-fabricated module that is configured to be pressure-tolerant and to provide an interface for connection of the optical seismic sensor package 748 and the optical telemetry block, shown at 647 in FIG. 6, to the floodable optical cable 730. The optical seismic sensor package 748 can have tight buffered optical fibers 754-1, 754-2, as described herein, connected to the splice management tray 749 for input and/or output of optical signals. In addition, the splice management tray 749 can have tight buffered optical fibers 753-1, 753-2 connected to the floodable optical cable 730 for input and/or output of optical signals. That is, the tight buffered optical fibers 753-1, 753-2 can be spliced to another tight buffered optical fiber coming from a floodable optical fiber conduit and/or spliced to an acrylate coated optical fiber coming from a hermetically sealed optical fiber conduit in the floodable optical cable 730. The optical telemetry block also can have tight buffered optical fibers for connection to the splice management tray 749. In some embodiments, the floodable optical cable 730 can have its outer cable jacket removed 734 within the free floodable cavity to facilitate access to the optical fibers.

In various embodiments, the two portions 742-1, 742-2 of the BSR member at each distal end of the floodable sensor station 738 can be mechanically connected by a rigid member (not shown) between the two portions 742-1, 742-1. In some embodiments, the two portions 742-1, 742-1 of the BSR member can each have an anti-rotation device 746-1, 746-2 to reduce rotation of the floodable optical cable 730 within the floodable sensor station 738 and/or to provide attachment of the floodable optical cable 730 to the floodable sensor station 738.

Within the floodable sensor station 738, an optical fiber splice can be made to connect the optical seismic sensor package 748 to one or more of the tight buffered optical fibers, shown at 211 in FIG. 2, and/or the acrylate coated optical fibers, shown at 101 in FIG. 1, that reside within the outer cable jacket 734 of the floodable optical cable 730. As described herein, such a splice can be made indirectly via the splice management tray 749. Similar optical fiber splice connections can be made between the optical telemetry block, shown at 647 in FIG. 6, and the tight buffered optical fibers and/or the acrylate coated optical fibers that reside within the outer cable jacket 734 of the floodable optical cable 730. The optical fiber splices may be protected with adhesive-lined heat shrinkable sleeves that are chemically benign in water. As used herein, chemically benign in water is intended to mean that the sleeves do not chemically react with water. The splices for the interconnected optical fibers may be performed upon and reside on the splice management tray 749 that divides the case halves shown at 643-1, 643-2 in FIG. 6. This construction can allow the floodable optical cable 730 and the floodable sensor station 738 to flood on deployment without designing and/or manufacturing complex barriers to reduce potential effects of exposure to hydrogen and/or water, which may be under high pressure. As such, this cable section architecture may be more modular, serviceable, and cost effective in manufacturing and deployment compared to other approaches.

To enable lengths of tight buffered optical fiber in a floodable optical fiber conduit to be limited in long cables, some floodable optical cable embodiments incorporate hermetically sealed conduits within an outer cable jacket of the floodable optical cable, as shown in FIG. 4. At the cable end terminations of each cable section, these hermetically sealed conduits in the middle layer may be accessed to connect selected optical fibers therein to tight buffered optical fibers in the outer layer of the floodable optical cable and/or to connect optical fibers in one hermetically sealed conduit to optical fibers in a hermetically sealed conduit in an adjacent cable section. Connection of the cable sections at the cable end terminations and/or protection of the optical fiber splices can be provided by pressure-sealed modules (referred to as "splice cans") that may be maintained at about 1 atmosphere pressure while deployed subsea. Thus, some embodiments can have hermetically sealed optical fiber conduits that extend a full length of the floodable optical cable and the optical fibers within these hermetically sealed conduits may not be exposed to the outside environment, such as hydrogen and/or water under high pressure. Within the pressure-sealed modules, tight buffered optical fibers within the floodable optical fiber conduit in the outer layer may be spliced to the optical fibers within the hermetically sealed conduit in the middle layer in the same cable section and/or in adjacent cable sections. In addition to splicing, suitable connection techniques can include coupling via passive splitters, amplifiers, and/or active multiplexers. Active multiplexers may include amplifiers, filters, switches, frequency shifters, demodulators, buffers, and/or modulators.

Figure 8:
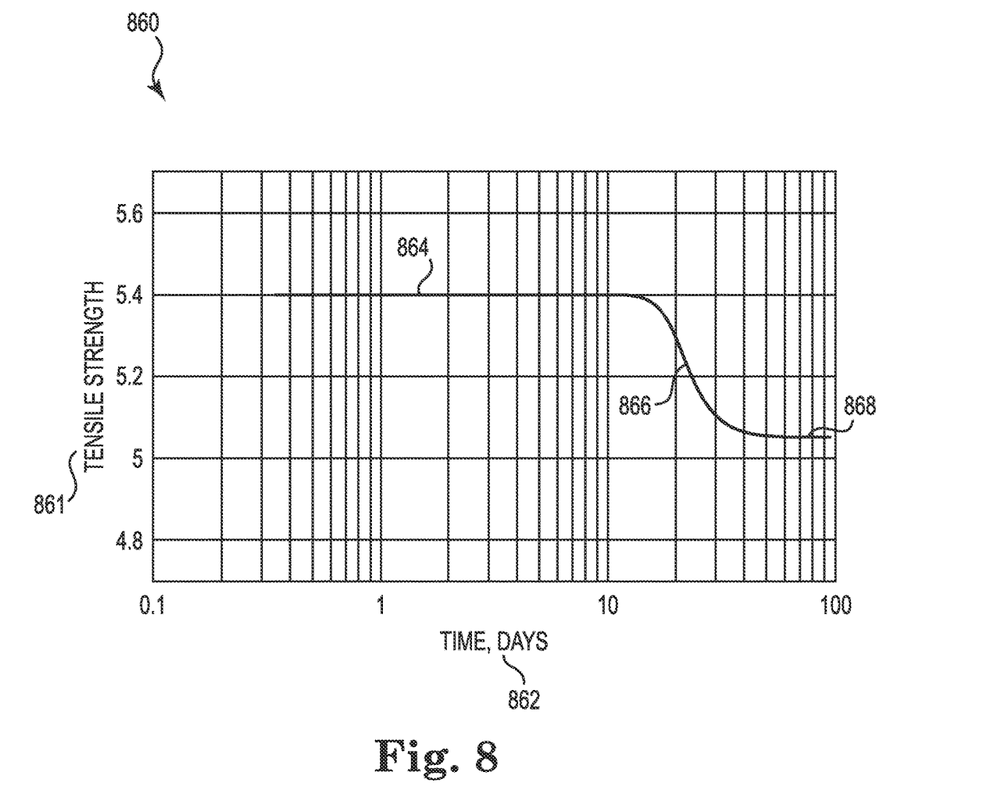
FIG. 8 is a graph illustration of limited tensile strength decrease for a tight buffered optical fiber with time when submerged in seawater consistent with use in an apparatus according to one or more embodiments of the present disclosure.

FIG. 8 illustrates a graph 860 of limited tensile strength decrease of a tight buffered optical fiber with time when submerged in seawater. The graph 860 shown in FIG. 8 has a vertical axis 861 that indicates a linear gradient of measured tensile strength for the tight buffered optical fiber, which can indicate the tensile strength as measured in gigapascals. The graph 860 has a horizontal axis 862 that indicates a logarithmic gradient of time that the tight buffered optical fiber has been submerged in seawater, as measured in days at about 20 degrees Celsius.

Before submergence in the seawater and shortly thereafter, the tight buffered optical fiber can have a relatively stable tensile strength 864. Upon submergence in the seawater, diffusion may begin and, after about 10 days, the tensile strength of the tight buffered optical fiber may be progressively reduced at 866 in graph 860 through silicate-driven crack propagation. After about 25 days, the rate at which the tight buffered optical fiber loses tensile strength may start to fall. After about 60 days, the tensile strength may become relatively stable at 868 in graph 860 with time, with a tensile strength at approximately 93 percent of the original value of the tensile strength.

The unprotected acrylate coating of optical fiber, such as described with regard to FIG. 1, can degrade at the same time as the optical fiber's glass weakens through silicate crack propagation. Once the acrylate coating is breached, water may be able to get directly to the optical fiber's glass rather than through diffusion. Consequently, the optical fiber may mechanically fail more rapidly than if the optical fiber had retained an intact acrylate coating. Adding an additional tight buffer of a plastic that is more stable in water may markedly reduce the rate of degradation of the acrylate coating. For tight buffered optical fiber, as described herein, water may diffuse and create silicates, as described previously, and the tensile strength of the glass may become reduced. However, the presence of the stable tight buffer may prevent physical breakdown of the acrylate coating, thereby reducing the probability of a breach in the coating.

Accordingly, as the silicates form, they may become physically trapped at an interface between the acrylate and the glass. Eventually, the surface of glass at the interface may become coated with silicate, which may provide a protective layer that limits further degradation of the tensile strength of the tight buffered optical fiber over time. Suitable tight buffer materials, such as thermoplastic elastomers and thermoplastic fluoropolymers, may display both water resistance and low relaxation. In instances where analysis of seabed soil and water indicates possibly increased hydrogen exposure, PVDF may be used as the tight buffering material on tight buffered optical fibers potentially exposed to water as it may offer increased impermeability to hydrogen while remaining stable in water (chemically benign).

Figure 9:
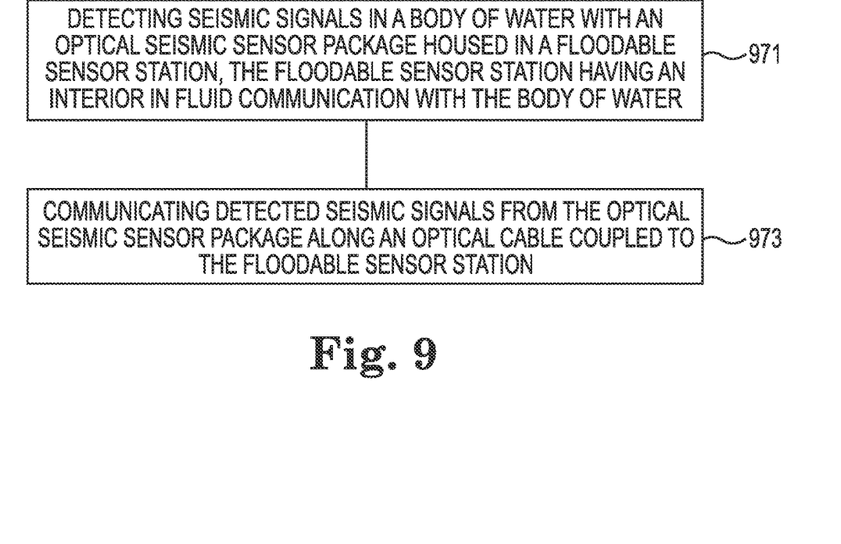
FIG. 9 illustrates a method flow diagram for using a floodable sensor station according to one or more embodiments of the present disclosure.

FIG. 9 illustrates a method flow diagram for using a floodable sensor station according to one or more embodiments of the present disclosure. As shown at block 971, the method can include detecting seismic signals in in a body of water with an optical seismic sensor package housed in a floodable sensor station, the floodable sensor station having an interior in fluid communication with the body of water. As shown at block 973, the method can, in various embodiments, include communicating detected seismic signals from the optical seismic sensor package along an optical cable coupled to the floodable sensor station. In at least one embodiment, the method further includes communicating detected seismic signals along a floodable optical cable having an interior in fluid communication with the body of water. In at least one embodiment, the method further includes communicating detected seismic signals from an optical component associated with the optical seismic sensor package via a floodable optical fiber conduit having an interior in fluid communication with the body of water. The floodable optical fiber conduit may be housed within the floodable optical cable. The method may also include communicating detected seismic signals from an optical component associated with the optical seismic sensor package within the floodable sensor station via at least one tight buffered optical fiber within the floodable optical fiber conduit. For example, in some embodiments, an optical seismic sensor package within the floodable sensor station can be configured for acquiring and outputting 4C and/or 4D seismic data by housing a three-axis optical accelerometer and an optical hydrophone that output optical seismic signals.

Figure 10:
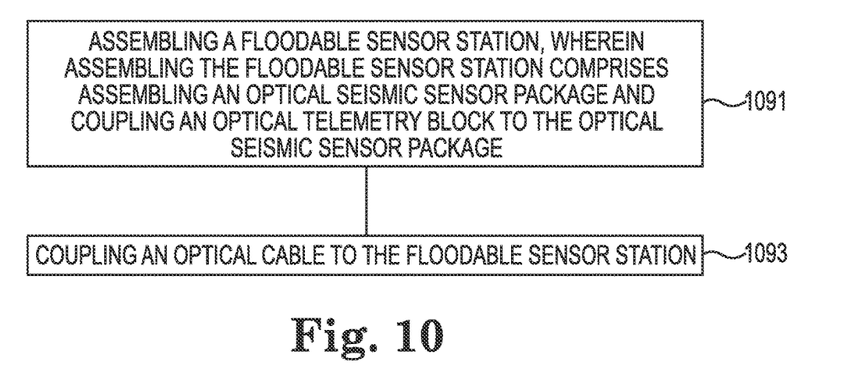
FIG. 10 illustrates a method flow diagram for assembling a floodable sensor station according to one or more embodiments of the present disclosure.

FIG. 10 illustrates a method flow diagram for assembling a floodable sensor station according to one or more embodiments of the present disclosure. As shown at block 1091, the method may include assembling a floodable sensor station. Assembling the floodable sensor station may include assembling an optical seismic sensor package and coupling an optical telemetry block to the optical seismic sensor package. As shown at block 1093, the method may also include coupling an optical cable to the floodable sensor station. In at least one embodiment, coupling the optical cable to the floodable sensor station may include using a splice management tray in the floodable sensor station to facilitate splicing of optical fibers from the optical cable to the optical seismic sensor package and the optical telemetry block. Further, assembling the optical seismic sensor package may include coupling a three axis optical accelerometer and an optical interferometer in an interior of a pressure-balanced sensor box and coupling an optical hydrophone to an exterior of the pressure-balanced sensor box. In at least one embodiment, coupling an optical cable to the floodable sensor station may include coupling a floodable optical cable having a plurality of fluid passages to the floodable sensor station. In at least one further embodiment, the method may include transiting a floodable optical fiber conduit through an interior of a floodable optical cable. According to various embodiments, a tight buffered optical fiber housed in the floodable optical fiber conduit may be coupled to the optical seismic sensor package in the floodable sensor station.

Although specific embodiments have been described above, these embodiments are not intended to limit the scope of the present disclosure, even where only a single embodiment is described with respect to a particular feature. For example, although the foregoing disclosure presents specific optical cable and optical fiber embodiments, which may be used to satisfy various challenges presented by the extreme environmental conditions experienced in PRM installation and associated life-span, such embodiments may also be applicable across multiple other scenarios and applications. Accordingly, examples of features and embodiments provided in this disclosure are intended to be illustrative rather than restrictive unless stated otherwise. The above disclosure is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    floodable optical cable housing a plurality of optical fiber conduits including:
        a floodable optical fiber conduit positioned within and adjacent to an interior wall of the floodable optical cable; and
        a hermetically sealed optical fiber conduit positioned within the interior wall of the floodable optical cable; and
    a floodable sensor station coupled to the optical cable.

2. The system of claim 1, wherein the floodable optical fiber conduit is coupled to an interior of the floodable sensor station to enable flooding of the floodable sensor station.

3. The system of claim 1, wherein the floodable optical cable includes an outer cable jacket having a plurality of fluid passages with partial piercings therethrough to enable flooding of the floodable optical cable.

4. The system of claim 1, wherein the floodable optical cable includes an outer cable jacket having periodic openings piercing entirely through the outer cable jacket to enable flooding of the floodable optical cable.

5. The system of claim 1, wherein the floodable optical fiber conduit comprises an outer tube having vents therethrough to enable flooding of the floodable optical fiber conduit.

6. The system of claim 1, wherein:
    an interior of the floodable sensor station houses an optical seismic sensing package optically coupled to the floodable optical cable; and the interior of the floodable sensor station is in fluid communication with an exterior of the floodable sensor station to enable flooding of the floodable sensor station such that the floodable sensor station can be pressure-balanced in a marine environment.

7. A system, comprising:
a floodable optical cable having a plurality of vents, the floodable optical cable housing a plurality of optical fiber conduits;
wherein at least one of the plurality of optical fiber conduits comprises a floodable optical fiber conduit having:
a plurality of vents; and
an optical fiber positioned within an interior wall of the floodable optical fiber conduit, wherein the optical fiber comprises:
a core material to carry optical signals;
a cladding material with a lower index of refraction than the core material and that is disposed around an outside surface of the core material;
a coating material disposed around an outside surface of the cladding material; and
a tight buffer disposed around an outside surface of the coating material; and
wherein at least one of the plurality of optical fiber conduits comprises a hermetically sealed optical fiber conduit; and
a floodable sensor station coupled to the floodable optical cable.

8. The system of claim 7, wherein the floodable sensor station comprises:
an optical seismic sensor package;
an optical telemetry block; and
a splice management tray to facilitate splicing of optical fibers in the floodable sensor station that couple the floodable optical cable, the optical seismic sensor package, and the optical telemetry block.

9. The system of claim 7, wherein the tight buffer comprises at least one of a thermoplastic elastomer and a thermoplastic fluoropolymer.

10. The system of claim 7, wherein the floodable optical cable further comprises:
a strength member.

11. The system of claim 7, further comprising:
a cable clamp mechanically connected to the floodable optical cable;
two case halves closed around the optical telemetry block, the splice management tray, the optical seismic sensor package, and the cable clamp; and
a bending strain relief member with the floodable optical cable passing therethrough, wherein the bending strain relief member is mechanically connected to the two case halves.

12. The system of claim 7, wherein the optical seismic sensor package comprises at least one of:
an optical hydrophone configured to be pressure-balanced;
a three-axis optical accelerometer configured to be pressure-balanced; and
a splice module configured to be pressure-balanced to facilitate splicing of optical fibers that couple optical components within the optical seismic sensor package.

13. The system of claim 7, wherein the at least one floodable optical fiber conduit is positioned within and adjacent to an interior wall of the floodable optical cable.

14. The system of claim 13, further comprising strength members helically wound within the interior wall of the floodable optical cable.

15. The system of claim 14, further comprising hermetically sealed optical fiber conduits positioned within the interior wall of the floodable optical cable.

16. The system of claim 15, wherein the hermetically sealed optical fiber conduits are positioned radially inward relative to the floodable optical fiber conduits.

17. The system of claim 13, further comprising a polymeric bedding layer disposed around the interior wall of the floodable optical cable to extend into interstices between the floodable optical fiber conduits and the strength members.

18. The system of claim 1, wherein the floodable sensor station comprises:
an optical seismic sensor package;
an optical telemetry block; and
a splice management tray to facilitate splicing of optical fibers in the floodable sensor station that couple the floodable optical cable, the optical seismic sensor package, and the optical telemetry block.

19. The system of claim 1, wherein the plurality of optical fiber conduits further comprise a strength member helically wound within the interior wall of the floodable optical cable.

20. The system of claim 1, wherein the hermetically sealed optical fiber conduit is positioned radially inward relative to the floodable optical fiber conduits.

21. The system of claim 1, further comprising a polymeric bedding layer disposed around the interior wall of the floodable optical cable to extend into interstices between the floodable optical fiber conduits and the strength members.

* * * * *